(12) United States Patent
Liu

(10) Patent No.: US 12,175,628 B2
(45) Date of Patent: Dec. 24, 2024

(54) TRAINING METHOD AND APPARATUS FOR IMAGE PROCESSING MODEL, AND IMAGE PROCESSING METHOD AND APPARATUS

(71) Applicant: BOE Technology Group Co., Ltd., Beijing (CN)

(72) Inventor: Hanwen Liu, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 505 days.

(21) Appl. No.: 17/631,481

(22) PCT Filed: Apr. 9, 2021

(86) PCT No.: PCT/CN2021/086243
§ 371 (c)(1),
(2) Date: Jan. 30, 2022

(87) PCT Pub. No.: WO2021/213188
PCT Pub. Date: Oct. 28, 2021

(65) Prior Publication Data
US 2022/0301106 A1    Sep. 22, 2022

(30) Foreign Application Priority Data

Apr. 24, 2020    (CN) .......................... 202010335224.3

(51) Int. Cl.
*G06V 40/18*    (2022.01)
*G06T 3/4053*    (2024.01)
(Continued)

(52) U.S. Cl.
CPC .......... *G06T 3/4053* (2013.01); *G06T 3/4076* (2013.01); *G06V 10/764* (2022.01);
(Continued)

(58) Field of Classification Search
CPC ... G06T 3/4053; G06T 3/4076; G06T 3/4046; G06V 10/764; G06V 10/774;
(Continued)

(56) References Cited

U.S. PATENT DOCUMENTS

2020/0065956 A1* 2/2020 Shen .................... G06V 10/764

FOREIGN PATENT DOCUMENTS

| CN | 108596830 A | 9/2018 |
| CN | 109389156 A | 2/2019 |
| CN | 110009003 A | 7/2019 |

* cited by examiner

*Primary Examiner* — Charlotte M Baker
(74) *Attorney, Agent, or Firm* — IPro, PLLC

(57) ABSTRACT

Provided are a training method and apparatus for an image processing image processing model, and an image processing method and apparatus. The training method comprises: acquiring a sample image and a first reference image, wherein the information quantity and resolution of the sample image are respectively lower than those of the first reference image; inputting the sample image into a generative network in an image processing model, and carrying out super-resolution processing and down-sampling processing on the sample image by means of the generative network, so as to generate and output at least one result image; determining the total image loss of the at least one result image according to the first reference image; and adjusting parameters of the generative network according to the total image loss, so that the total image loss of at least one result image output by the adjusted generative network meets an image loss condition.

20 Claims, 8 Drawing Sheets

(51) Int. Cl.
*G06T 3/4076* (2024.01)
*G06V 10/764* (2022.01)
*G06V 10/774* (2022.01)
*G06V 10/776* (2022.01)
*G06V 10/82* (2022.01)

(52) U.S. Cl.
CPC .......... *G06V 10/774* (2022.01); *G06V 10/776* (2022.01); *G06V 40/18* (2022.01); *G06V 10/82* (2022.01)

(58) Field of Classification Search
CPC ...... G06V 10/776; G06V 40/18; G06V 10/82; G06V 10/759; G06N 3/0455; G06N 3/0464; G06N 3/0475; G06N 3/08; G06N 3/045; G06F 18/214
USPC .......................................................... 382/157
See application file for complete search history.

TRAINING METHOD AND APPARATUS FOR IMAGE PROCESSING MODEL, AND IMAGE PROCESSING METHOD AND APPARATUS

CROSS-REFERENCE TO RELATED APPLICATIONS

The present disclosure is a National Stage of International Application No. PCT/CN2021/086243, filed on Apr. 9, 2021, which claims the priority of the Chinese patent application No. 202010335224.3 filed to the China National Intellectual Property Administration on Apr. 24, 2020, both of which are incorporated herein by reference.

FIELD

The present disclosure relates to the field of image processing technology, in particular to a method and apparatus for training an image processing model, and an image processing method and apparatus.

BACKGROUND

A deep learning technology has developed by leaps and bounds in the past five years. All major enterprises invest huge capitals and human power to research on the deep learning technology and constantly launch its specific products and technologies. The current deep learning technology is mainly used for solving the problems including: engine recommendation, image classification, image search, face recognition, age recognition, voice recognition, etc. The deep learning technology has made a breakthrough in the field of human-like data aware, for example, describing image contents, recognizing objects under a complex environment in images, and recognizing voices in a noisy environment. Meanwhile, the deep learning technology may further solve the problems of image generation and fusion. Compared with a traditional method, the deep learning technology is similar to a huge filter.

SUMMARY

At a first aspect, an embodiment of the present disclosure provides a method for training an image processing model. The image processing model includes a generative network, and the method includes: obtaining a sample image and a first reference image, wherein an information quantity and a resolution of the sample image are lower than an information quantity and a resolution of the first reference image, respectively; inputting the sample image into the generative network, and performing super-resolution processing and down-sampling processing on the sample image through the generative network to generate and output at least one result image; determining a total image loss of the at least one result image according to the first reference image; and adjusting parameters of the generative network according to the total image loss, so that a total image loss of at least one result image output by the adjusted generative network meets an image loss condition.

In one possible implementation, in the method provided by the embodiment of the present disclosure, the generative network includes a first super-resolution sub-network, a down-sampling sub-network and a second super-resolution sub-network sequentially cascaded; and the inputting the sample image into the generative network, and the performing the super-resolution processing and the down-sampling processing on the sample image through the generative network to generate and output the at least one result image, includes: inputting the sample image into the first super-resolution sub-network, and performing the super-resolution processing on the sample image through the first super-resolution sub-network so as to obtain a first feature image, wherein a resolution of the first feature image is higher than the resolution of the sample image; performing the down-sampling processing on the first feature image through the down-sampling sub-network so as to obtain at least one second feature image, wherein a resolution of the second feature image is lower than the resolution of the first feature image; and performing the super-resolution processing on the second feature image through the second super-resolution sub-network so as to obtain and output the first result image, wherein a resolution of the first result image is higher than the resolution of the second feature image.

In one possible implementation, in the method provided by the embodiment of the present disclosure, the down-sampling sub-network includes a first down-sampling branch and a second down-sampling branch in parallel; and the performing the down-sampling processing on the first feature image through the down-sampling sub-network to obtain the at least one second feature image includes: performing the down-sampling processing on the first feature image through the first down-sampling branch to obtain one second feature image; and performing the down-sampling processing on the first feature image through the second down-sampling branch to obtain another second feature image, wherein an information quantity of the second feature image obtained through the second down-sampling branch is greater than an information quantity of the second feature image obtained through the first down-sampling branch.

In one possible implementation, in the method provided by the embodiment of the present disclosure, the generative network further includes: a first feature extraction sub-network cascaded after the first super-resolution sub-network and a second feature extraction sub-network cascaded after the down-sampling sub-network; the inputting the sample image into the generative network, and the performing the super-resolution processing and the down-sampling processing on the sample image through the generative network to generate and output the at least one result image, further includes: performing feature extraction on the first feature image through the first feature extraction sub-network so as to obtain and output a second result image; and performing feature extraction on the second feature image through the second feature extraction sub-network so as to obtain and output a third result image; and the determining the total image loss of the at least one result image according to the first reference image includes: generating a second reference image according to the first reference image; and determining a total image loss of the first result image, the second result image and the third result image according to the first reference image and the second reference image.

In one possible implementation, in the method provided by the embodiment of the present disclosure, the generative network further includes: a first feature extraction sub-network cascaded after the first super-resolution sub-network; the inputting the sample image into the generative network of the image processing model, and the performing the super-resolution processing and the down-sampling processing on the sample image through the generative network to generate and output the at least one result image, further includes: performing feature extraction on the first feature image through the first feature extraction sub-network so as to obtain and output a second result image; and the determining the total image loss of the at least one result image according to the first reference image includes: determining a total image loss of the first result image and the second result image according to the first reference image.

In one possible implementation, in the method provided by the embodiment of the present disclosure, the generative network further includes: a second feature extraction sub-network cascaded after the down-sampling sub-network; the inputting the sample image into the generative network of the image processing model, and the performing the super-resolution processing and the down-sampling processing on the sample image through the generative network to generate and output the at least one result image, further includes: performing feature extraction on the second feature image through the second feature extraction sub-network to obtain and output a third result image; and the determining the total image loss of the at least one result image according to the first reference image includes: generating a second reference image according to the first reference image, and determining a total image loss of the first result image and the third result image according to the first reference image and the second reference image.

In one possible implementation, in the method provided by the embodiment of the present disclosure, the total image loss includes: at least one of a content loss, an against loss, a weighted L1 loss or an eye region loss; and in a condition that the total image loss includes at least one of the weighted L1 loss or the eye region loss, the determining the total image loss of the at least one result image according to the first reference image includes at least one of following loss determination modes: determining the weighted L1 loss according to a difference between a pixel value of the at least one result image and a pixel value of the first reference image; and determining the eye region loss according to a content loss of an eye region in the at least one result image and an eye region in the first reference image.

In one possible implementation, in the method provided by the embodiment of the present disclosure, the determining the eye region loss according to the content loss of the eye region in the at least one result image and the eye region in the first reference image, includes: for each result image, determining a content loss of a total eye region in the result image and a total eye region in the first reference image, and a content loss of a first eye region and a second eye region in the result image to serve as a total content loss and a result image content loss, respectively; determining a content loss of a first eye region and a second eye region in the first reference image to serve as a reference image loss, wherein in the result image and the first reference image, the total eye regions include the first eye regions and the second eye regions, and the first eye regions do not overlap the second eye regions; and determining the eye region loss of the result image and the first reference image according to the total content loss, the result image loss and the reference image loss.

In one possible implementation, in the method provided by the embodiment of the present disclosure, the method further includes: inputting the first reference image and the at least one result image into a discrimination network in the image processing model; discriminating the first reference image and the at least one result image through the discrimination network to determine whether the first reference image and the at least one result image have a preset feature, and outputting a reference image label and a result image label, wherein the reference image label represents a discriminating result on the first reference image, and the result image label represents a discriminating result on the at least one result image; determining an against loss of the result image label according to the reference image label; and adjusting parameters of the discrimination network according to the against loss, so that an against loss of a result image label output by the adjusted discrimination network meets an against loss condition.

In one possible implementation, in the method provided by the embodiment of the present disclosure, the method further includes: deploying the trained image processing model on a target device.

At a second aspect, an embodiment of the present disclosure provides an image processing method, including: obtaining a to-be-processed image; and inputting the to-be-processed image into an image processing model obtained by training, wherein the image processing model includes a generative network, and obtaining a processed image based on an output of the generative network.

In one possible implementation, in the image processing method provided by the embodiment of the present disclosure, the image processing model is obtained by training through the method for training the image processing model provided by the first aspect of the embodiment of the present application.

In one possible implementation, in the image processing method provided by the embodiment of the present disclosure, the generative network includes a first super-resolution sub-network, a down-sampling sub-network and a second super-resolution sub-network sequentially cascaded; and inputting the to-be-processed image into the first super-resolution sub-network, and performing super-resolution processing on the to-be-processed image through the first super-resolution sub-network so as to obtain a first feature image; performing down-sampling processing on the first feature image through a down-sampling sub-network so as to obtain at least one second feature image; and performing the super-resolution processing on the second feature images through a second super-resolution sub-network so as to generate and output a first result image, wherein the first result image is a final result image output by the generative network.

In one possible implementation, in the image processing method provided by the embodiment of the present disclosure, a down-sampling sub-network includes a first down-sampling branch and a second down-sampling branch in parallel; and the performing the down-sampling processing on the first feature image through the down-sampling sub-network to obtain the at least one second feature image includes: performing the down-sampling processing on the first feature image through the first down-sampling branch to obtain one second feature image; and performing the down-sampling processing on the first feature image through the second down-sampling branch to obtain another second feature image, wherein an information quantity of the second feature image obtained through the second down-sampling branch is greater than an information quantity of the second feature image obtained through the first down-sampling branch.

At a third aspect, an embodiment of the present disclosure provides a training apparatus of an image processing model, including: an image obtaining module, configured to obtain a sample image and a first reference image, wherein an information quantity and a resolution of the sample image are lower than an information quantity and a resolution of the first reference image, respectively; an image generating module, configured to input the sample image into a generative network in the image processing model, and perform super-resolution processing and down-sampling processing on the sample image through the generative network to generate and output at least one result image; an image loss determining module, configured to determine a total image loss of the at least one result image according to the first reference image; and a generative network adjusting module, configured to adjust parameters of the generative network according to the total image loss, so that a total image loss of at least one result image output by the adjusted generative network meets an image loss condition.

At a fourth aspect, an embodiment of the present disclosure provides an image processing apparatus, including: an image obtaining module, configured to obtain a to-be-processed image; and an image processing module, configured to input the to-be-processed image into an image processing model obtained by training, wherein the image processing model includes a generative network, and obtaining a processed image based on an output of the generative network, wherein the image processing model is obtained by training through the method for training the image processing model provided by the first aspect of the embodiment of the present disclosure.

At a fifth aspect, an embodiment of the present disclosure provides an image processing device, including: a memory, storing a computer program; and a processor, electrically connected with the memory, wherein the computer program is executed by the processor to implement the method for training the image processing model provided by the first aspect of the embodiment of the present disclosure, and/or, implement the image processing method provided by the second aspect of the embodiment of the present disclosure.

At a sixth aspect, an embodiment of the present disclosure provides a non-transitory computer readable storage medium, storing a computer program, wherein the computer program, when executed by a processor, implements the method for training the image processing model provided by the first aspect of the embodiment of the present disclosure, and/or, implements the image processing method provided by the second aspect of the embodiment of the present disclosure.

DETAILED DESCRIPTION OF THE EMBODIMENTS

Figure 1:
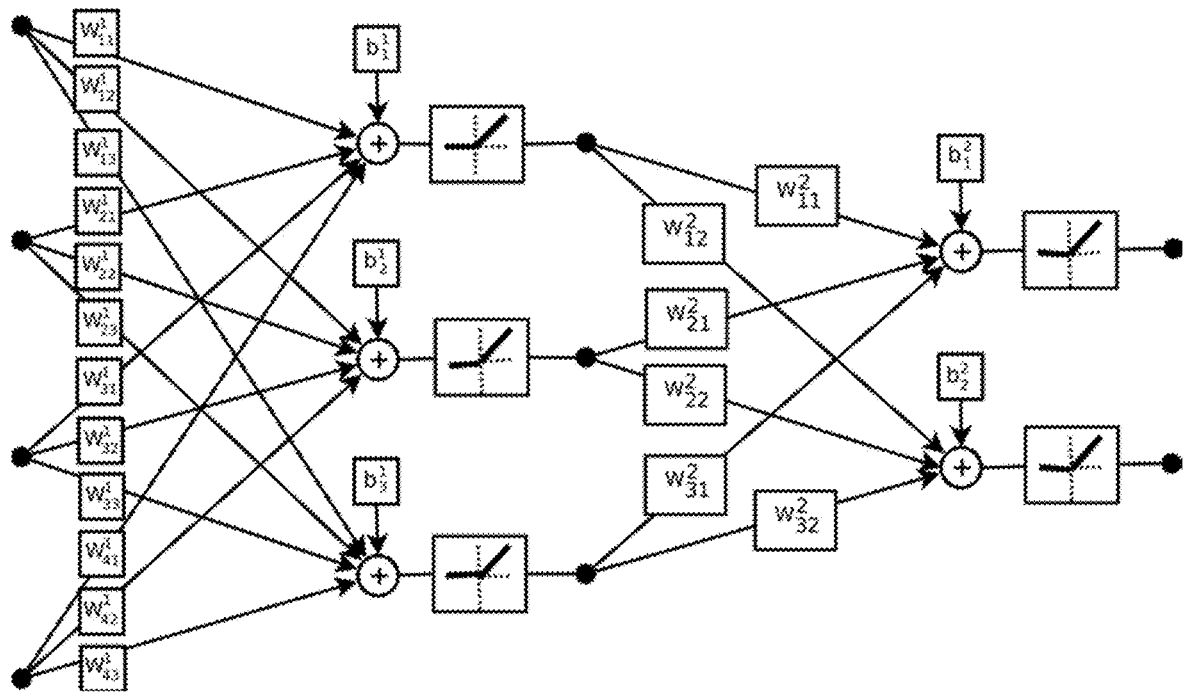
FIG. 1 is a schematic structural diagram of a convolutional neural network.

Face sharpening (also known as face hallucination) is an emerging image processing technology with development of a deep learning technology. The technology may recover a blurry face photo into a clear photo. The technology has a huge application space in the fields of old photo processing and photo beautification.

A typical technology for face sharpening by utilizing deep learning is to complete a task of face sharpening through three mutually and completely independent models (a decoder 1, an encoder and a decoder 2). In a training process, the above three models are trained respectively, and when the decoder 2 is trained, corresponding parameters may only be updated based on output of the decoder 2. The method is tedious and low in efficiency, a trained model is poor in quality, a finally output image is poor in overall visual quality, and an image quality is not much improved compared with an originally input image.

The present disclosure is described below in detail. Examples of the embodiment of the present disclosure are shown in drawings. The same or similar reference numbers represent the same or similar components or components with the same or similar functions from beginning to end. In addition, if detailed description of a known technology is unnecessary for shown features of the present disclosure, it is omitted. The embodiments described below with reference to the drawings are exemplary, are only configured to explain the present disclosure, and cannot be interpreted as limitation to the present disclosure.

It should be understood by those skilled in the art that unless otherwise defined, all the terms (including technical terms and scientific terms) used herein have the same meanings generally understood by those ordinarily skilled in the art to which the present disclosure belongs. It should be further understood that those terms, such as defined in a general dictionary, should be understood as having meanings consistent with meanings in the context of the related art, and are not explained with idealized or excessively official implication unless specifically defined like here.

Those skilled in the art should understand that unless expressly stated, singular forms "one", "a", "the said" and "this" used here may also include plural forms. It should be further understood that the wording "include" used in the specification of the present disclosure refers to existence of a feature, an integer, a step, an operation, an element and/or a component, but not excluding existence or adding one or more other features, integers, steps, operations, elements, components and/or their combinations. It should be understood that when we called that the element is "connected" or "coupled" to the other element, it can be directly connected or coupled to the other element, or there may be an intermediate element. In addition, "connection" or "coupling" used here may include wireless connection or wireless coupling. The wording "and/or" used here includes all or any unit and all combinations of one or more associated listed items.

Part of terms involved in the present disclosure are introduced and explained firstly.

A Convolutional Neural Network

The convolutional neural network is a special structure of a neural network, uses an image as input and output of a system, and uses a convolution kernel to replace a scalar weight. One convolutional neural network with a three-layer structure is as shown in FIG. 1, this network has four inputs, a hidden layer has three outputs, an output layer contains two outputs, and finally, the system outputs two images. Each module $w_{ij}^k$ represents one convolution kernel, k represents a serial number of an input layer, and i and j represent unit numbers of the inputs and outputs. Bias $b_i^k$ is a set of scalar superimposed on the outputs of a convolutional layer. Then the convolutional layer with the superimposed bias will enter an activation layer (usually RELU or sigmoid function). After being trained, the convolutional kernel and bias of the system are stationary, and training is to perform parameter tuning on the convolutional kernel and the bias through a set of matched input and output as well as an optimization algorithm. Generally, each convolutional layer may contain dozens of or hundreds of convolutional kernels, and a deep neural network often contains five or more convolutional layers.

DEMUX Layer

Figure 2:
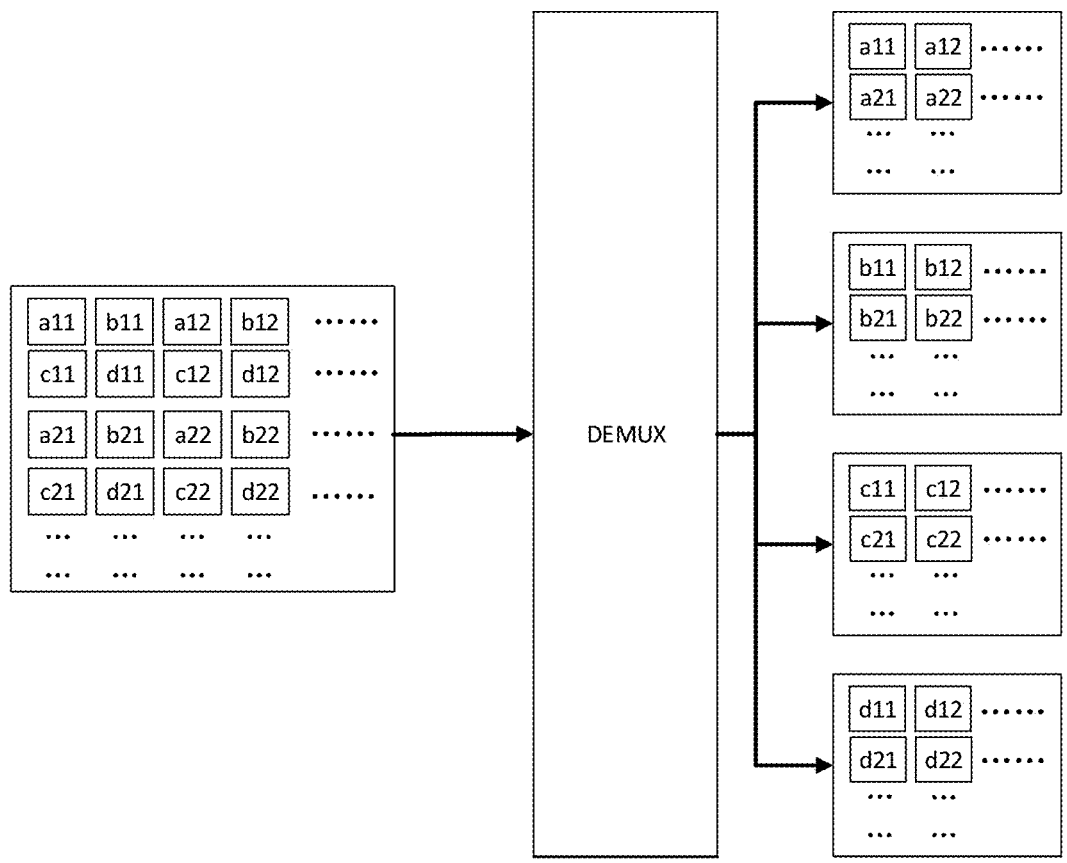
FIG. 2 is a schematic principle diagram of a DEMUX layer in an embodiment of the present disclosure.

An effect of the DEMUX layer is to decompose one two-dimensional matrix into four small matrixes with both length and width being half that of the original matrix, as shown in FIG. 2.

When applied in image processing, the DEMUX layer may scramble pixels in the image, and decomposes one image into four small images, wherein both the length and the width of the small images are ½ that of the original image, and the DEMUX layer may be used as a down-sampling layer in the convolutional neural network.

MUX Layer

Figure 3:
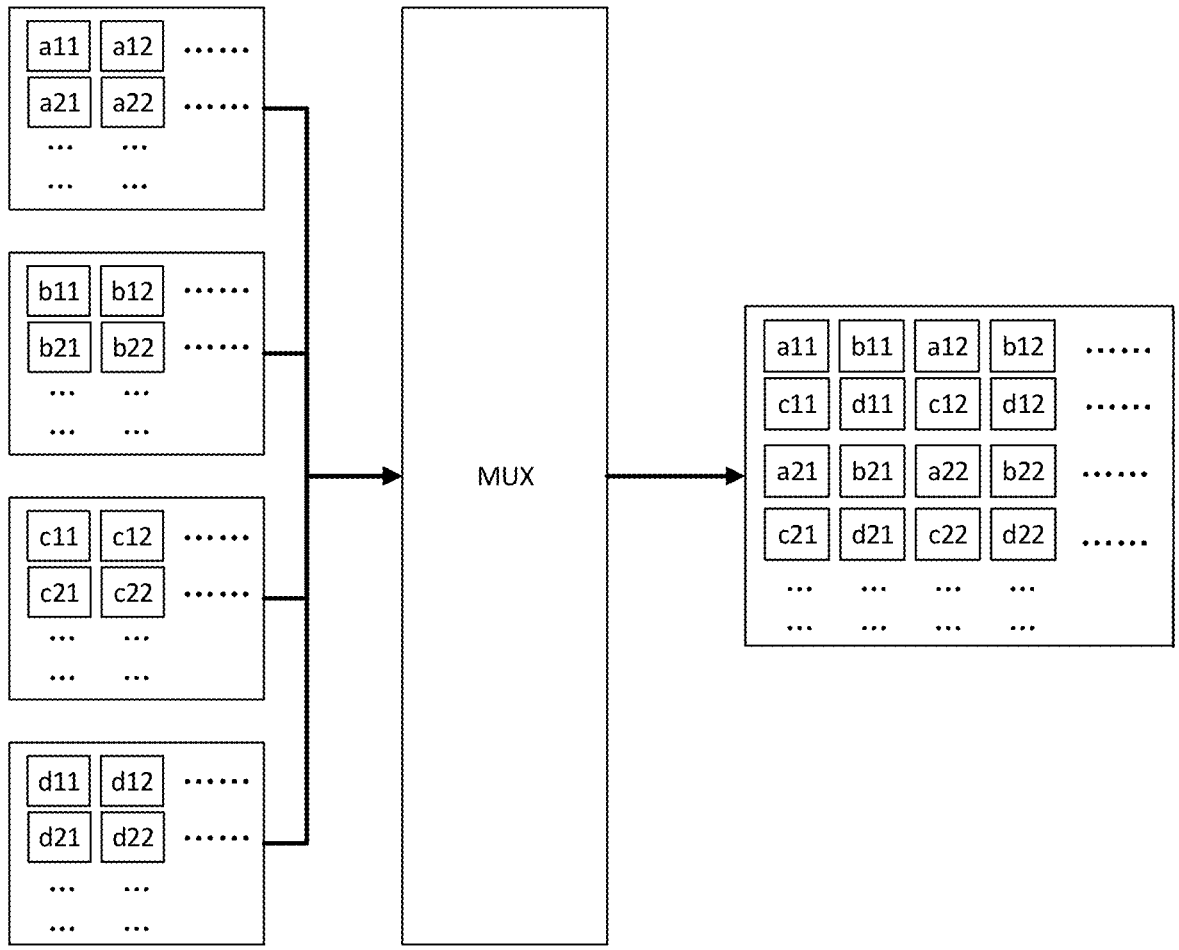
FIG. 3 is a schematic principle diagram of an MUX layer in an embodiment of the present disclosure.

An effect of the MUX layer is to combine the two-dimensional matrixes, and may combine the four small matrixes with a consistent size into one large matrix, wherein both the length and the width of the large matrix are two times that of the small matrixes, as shown in FIG. 3.

When applied in image processing, the MUX layer may scramble pixels in the images, and combine the four small images into one large image, wherein both the length and the width of the large image are two times that of the small images, and the MUX layer may be used as an up-sampling layer in the convolutional neural network.

It can be seen with reference to FIG. 2 and FIG. 3, MUX and DEMUX are mutually in inverse operation. In a processing process, only positions of pixels are rearranged according to a certain rule without losing any pixel information, and therefore, MUX and DEMUX may perform up-sampling and down-sampling processing on the images without loss.

Loss Function

1) Content Loss

In an analysis network, output of each convolutional layer is features of input images. It is assumed that the output of the certain convolutional layer with $N_l$ convolutional kernels outputs contains $N_l$ feature images, and it is assumed that a size of each feature image is $M_l$ (width×height of feature image). In this way, the output of l layer may be stored in a matrix $F^l \in R^{N_l \times M_l}$. $F_{ij}^l$ represents a value at a $j^{th}$ position in a feature image output by the $i^{th}$ convolutional kernel in the l layer.

$\vec{p}$ and $\vec{x}$ are respectively defined as an original input image and a generation image, $P^l$ and $F^l$ are respectively the feature images of the outputs at the l layer in the analysis network, and thus a definition of the content loss is as following:

$$L_{content} = \frac{1}{2C1} \sum_{ij} (F_{ij}^l - P_{ij}^l)^2. \quad \text{Expression (1)}$$

Where $L_{content}$ represents the content loss, and C1 is a constant, configured to perform standardized processing on a result.

2) Against Loss

An against loss function of a discrimination network (also called discriminator) is:

$$L\_D = -E_{x \sim Pdata(x)}[\log D(x)] - E_{z \sim Pz(z)}[1-\log D(G(z))] \quad \text{Expression (2).}$$

An against loss function of a generative network (also called generator) is:

$$L\_G = E_{x \sim Pdata(x)}[\log D(x)] + E_{z \sim Pz(z)}[1-\log D(G(z))] \quad \text{Expression (3).}$$

In expression (2) and expression (3), D is the discrimination network, G is the generative network; L_D is an against loss of an output result of the discrimination network, and L_G is an against loss of an output result of the generative network; z is the inputs of the generative network, and Pz is an input set of the generative network; x is a certain true sample, and Pdata is a true sample set, namely a set capable of making the outputs of the discrimination network be 1; D(x) is a result obtained after inputting the true sample into the discrimination network, and G(z) is an output result of the generative network; $E_{x \sim Pdata(x)}$ represents that sample x from the true sample set and executes a subsequent operation on any x; and $E_{z \sim Pz(z)}$ represents that sample z from the input set Pz of the generative network and executes the subsequent operation on any z.

3) Weighted L1 Loss

If a training data set contains paired data, the weighted L loss may be utilized to constrain the output images, so as to obtain a better image reduction degree. A definition of the L1 loss is as following:

$$L1 = 0.299 * (abs(R_i - R_g)) + 0.587 * (abs(G_i - G_g)) + 0.114 * (abs(B_i - B_g)) \quad \text{Expression (4).}$$

In the expression (4), $R_i$, $G_i$, $B_i$ are respectively R, G and B channels of the output result, $R_g$, $G_g$, $B_g$ are respectively R, G and B channels of high quality (relative to an image quality in a training data set, the image quality may be represented by an information quantity of the images, and the information quantity may further be represented by an information entropy) images in a data set, and abs( ) is an absolute value operation. In a training process, in order to obtain a better image watching experience, a weight of the weighted L1 loss is inadvisable to be set to be too high. In the expression (4), weights of the R, G and B channels are set to be 0.299, 0.587 and 0.114 respectively. The weight values do not serve as limitation to the weighted L1 loss in the embodiment of the present disclosure, and may be replaced with other weight values according to the actual condition.

4) Eye Region Loss

In order to improve authenticity of generated portrait photos, especially the authenticity and symmetry of the eye part, the present disclosure provides a new eye region loss. A height of a total eye region is made to be h and a width of the total eye region is made to be w, and the eye region loss is defined as following:

$$L_{eye} = L_{content}(O_{eye}, G_{eye}) + L_{content}(O_{eye}[:,0:0.5w], O_{eye}[:,0.5w:w]) + L_{content}(G_{eye}[:,0:0.5w], G_{eye}[:,0.5w:w])$$

Expression (5).

In the expression (5), $O_{eye}$ is the total eye region of the output image, $G_{eye}$ is a total eye region of the high quality (relative to the quality of the originally input image) images, and $L_{content}(O_{eye}, G_{eye})$ is the content loss of the two total eye regions. If it is defined that a width value at a leftmost end (the left and the right are subjected to an angle that human eyes observe images on a paper or a display interface) of the total eye region is 0, a width value of a rightmost end is w, $O_{eye}[:,0:0.5w]$ represents a left half region in the total eye region of the output images, $O_{eye}[:,0.5w:w]$ represents a right half region in the total eye region, $G_{eye}[:,0:0.5w]$ represents a left half region of the total eye region in the high quality images, and $G_{eye}[:,0.5w:w]$ represents a right half region of the total eye region in the high quality images; and $L_{content}(O_{eye}[:,0:0.5w], O_{eye}[:,0.5w:w])$ represents a content loss of the left half region and the right half region in the total eye region of the output images, and $L_{content}(G_{eye}[:,0:0.5w], G_{eye}[:,0.5w:w])$ represents a content loss of the left half region and the right half region of the total eye region in the high quality images.

The eye region loss may enhance an approximate degree of the eye region of the output image and the high quality image, and meanwhile, constrains its zygomorphy to be consistent with that of the high quality image.

The loss function in the embodiment of the present disclosure may be any one of existing loss functions such as a cross-entropy loss function, a hinge loss function, an exponential loss function, or a Softmax loss function, which may be selected according to actual demand. The loss functions listed in the embodiment of the present disclosure are only examples, and do not constitute limitation to the present disclosure.

The technical solutions of the present disclosure and how to solve the above technical problem through the technical solutions of the present disclosure are illustrated below in detail through the specific embodiments.

An embodiment of the present disclosure provides an image processing model, including: a generative network. The generative network may be configured to perform super-resolution processing and down-sampling processing on an image input to the generative network, so as to generate and output at least one result image; and the at least one result image may include at least one of a first result image, a second result image or a third result image.

Figure 4:
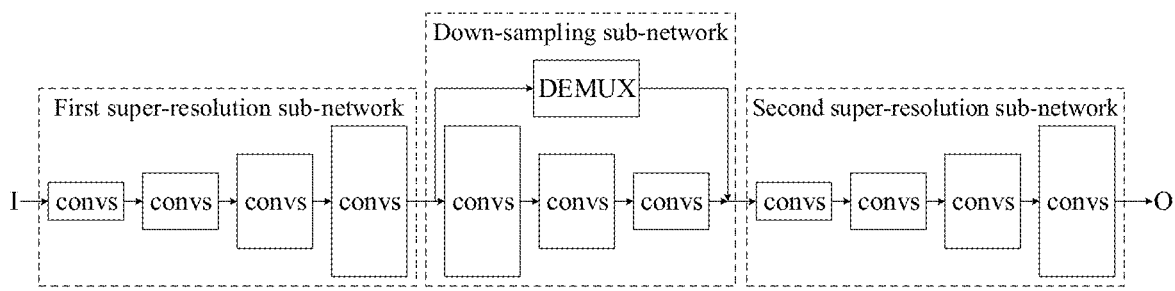
FIG. 4 is a schematic structural diagram of a generative network in an embodiment of the present disclosure.

In one optional implementation, as shown in FIG. 4, the generative network includes: a first super-resolution sub-network, a down-sampling sub-network and a second super-resolution sub-network sequentially cascaded.

The first super-resolution sub-network is configured to perform super-resolution processing on an image (such as I in FIG. 4) input into the first super-resolution sub-network, so as to obtain a first feature image; the down-sampling sub-network is configured to perform down-sampling processing on the first feature image, so as to obtain at least one second feature image; and a second super-resolution sub-network is configured to perform the super-resolution processing on the second feature image, so as to generate and output the first result image (such as O in FIG. 4), and the first result image is a final result image output by the generative network.

Figure 5:
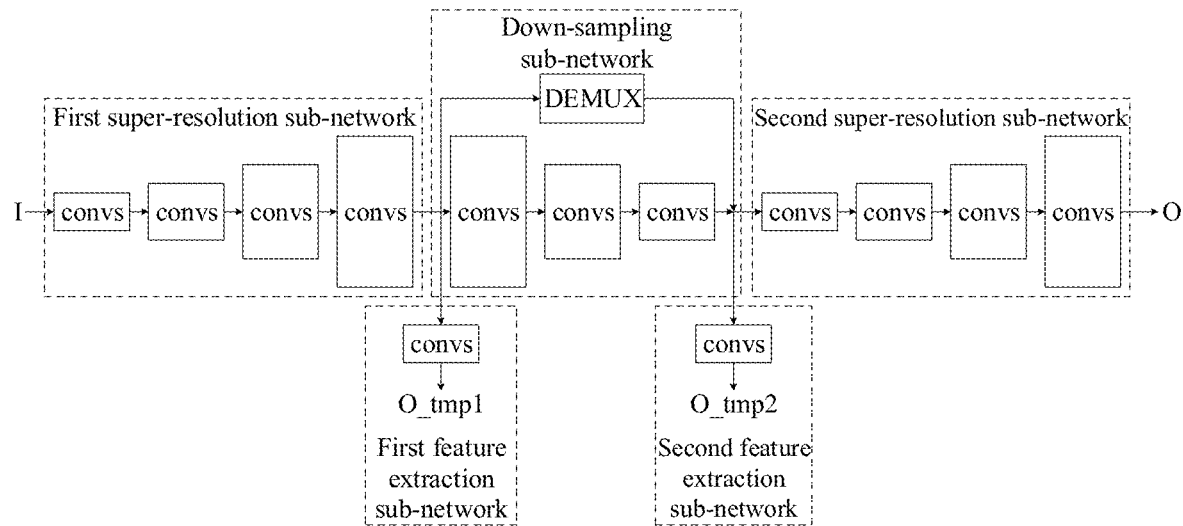
FIG. 5 is a schematic structural diagram of another generative network in an embodiment of the present disclosure.

In another optional implementation, as shown in FIG. 5, on the basis of the first super-resolution sub-network, the down-sampling sub-network and the second super-resolution sub-network, the generative network further includes: a first feature extraction sub-network cascaded after the first super-resolution sub-network and a second feature extraction sub-network cascaded after the down-sampling sub-network.

The first feature extraction sub-network is configured to perform feature extraction on the first feature image output by the first super-resolution sub-network, so as to obtain and output the second result image (such as O_tmp1 in FIG. 5); and the second feature extraction sub-network is configured to perform feature extraction on the second feature image output by a down-sampling sub-network, so as to generate and output the third result image (such as O_tmp2 in FIG. 5). Both the second result image and the third result image are intermediate result images output by the generative network.

In further another optional implementation, on the basis of the first super-resolution sub-network, the down-sampling sub-network and the second super-resolution sub-network, the generative network further includes: a first feature extraction sub-network cascaded after the first super-resolution sub-network and a second feature extraction sub-network cascaded after the down-sampling sub-network. Functions of the first feature extraction sub-network and the second feature extraction sub-network are as previously mentioned.

Optionally, the first super-resolution sub-network and the second super-resolution sub-network each includes a plurality of cascaded convolutional blocks (convs). The quantity of the convolutional blocks in the first super-resolution sub-network and the second super-resolution sub-network is not limited in the embodiment of the present disclosure.

In an optional implementation, at least part of the convolutional blocks of the first super-resolution sub-network and the second super-resolution sub-network are first convolutional blocks, and the rest convolutional blocks are second convolutional blocks, wherein the first convolutional block includes the at least one convolutional layer cascaded sequentially, and an up-sampling layer cascaded after the at least one convolutional layer, and the second convolutional block includes the at least one convolutional layer cascaded sequentially.

In one example, the first three convs in the first super-resolution sub-network and the first three convs in the second super-resolution sub-network in FIG. 4 or FIG. 5 are each set to be the first convolutional block, and the fourth convs in the first super-resolution sub-network and the fourth convs in the second super-resolution sub-network are each set to be the second convolutional block.

In another example, the first two convs in the first super-resolution sub-network and the first two convs in the second super-resolution sub-network in FIG. 4 or FIG. 5 are each set to be the first convolutional block, and the latter two convs in the first super-resolution sub-network and the latter two convs in the second super-resolution sub-network are each set to be the second convolutional block.

In other examples, as for the first super-resolution sub-network and the second super-resolution sub-network, other convolutional block arranging modes may further be adopted according to actual demands, and the first super-resolution sub-network and the second super-resolution sub-network may adopt the same convolutional block arranging mode or the different convolutional block arranging modes according to the actual demands.

Optionally, the up-sampling layers in the first convolutional blocks may be the MUX layer as previously mentioned.

Optionally, a down-sampling sub-network in the embodiment of the present disclosure includes a first down-sampling branch and a second down-sampling branch in parallel. The first down-sampling branch may include the plurality of cascaded convolutional blocks convs, and the quantity of the convolutional blocks in the first down-sampling branch is not limited in the embodiment of the present disclosure. The second down-sampling branch may include a down-sampling layer.

In an optional implementation, the convolutional blocks in the first down-sampling branch may be set to be third convolutional blocks, and each third convolutional block may include the at least one convolutional layer cascaded sequentially, and a down-sampling layer cascaded after the at least one convolutional layer.

Optionally, the down-sampling layer in the first down-sampling branch and the down-sampling layer in the second down-sampling branch may be both the DEMUX layer as previously mentioned.

Optionally, the first feature extraction sub-network and the second feature extraction sub-network in the embodiment of the present disclosure each includes the at least one convolutional block cascaded sequentially. The quantity of the convolutional blocks in the first feature extraction sub-network and the second feature extraction sub-network is not limited in the embodiment of the present disclosure.

In one optional implementation, the convolutional blocks in the first feature extraction sub-network and the second feature extraction sub-network may be both set to be the second convolutional blocks, and a structure of the second convolutional blocks is as previously mentioned.

Optionally, the image processing model provided by the embodiment of the present disclosure may further include: a discrimination network. The discrimination network is configured to discriminate an image input into the discrimination network, determine whether the input image has a preset feature, and output an image label. When the discrimination network is cascaded after the generative network, the discrimination network may be configured to constrain output of the generative network, specifically, receive the at least one result image output by the generative network, and discriminate the at least one result image.

The image label output by the discrimination network is configured to represent a discriminating result of the discrimination network for the input images. The image label may be represented with "1" or "0", or represented with "true" or "fake". "1" and "true" each represents that the image has the preset feature, and "0" and "fake" each represents that the image does not have the preset feature.

Figure 6:
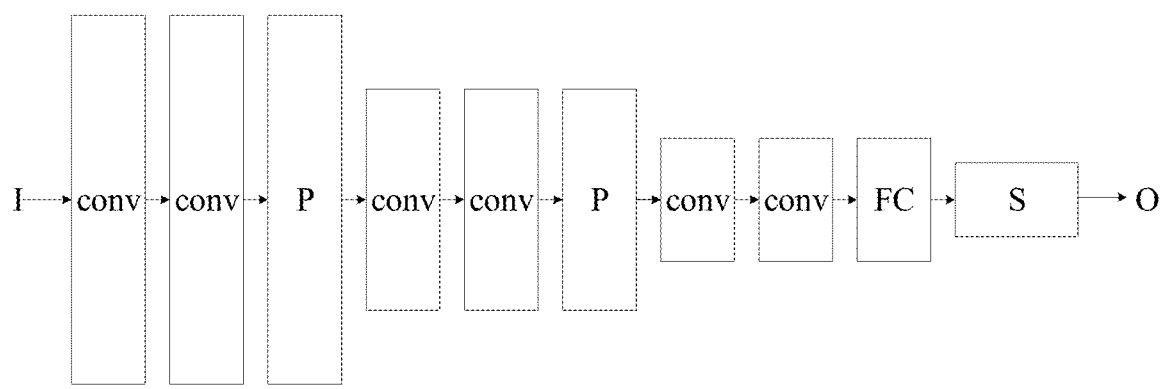
FIG. 6 is a schematic structural diagram of a discrimination network in an embodiment of the present disclosure.

In one optional implementation, the discrimination network in the embodiment of the present disclosure includes the plurality of convolutional layers (conv), pooling layers (P), fully connected layer(s) (FC) and activation layer(s) (S), and cascade modes of all the layers are as shown in FIG. 6. The convolutional layers and the pooling layers are configured to process the input images, and then output scalar values are obtained through the fully connected layer(s) and the activation layer(s).

Optionally, there may be at least one discrimination network set in the embodiment of the present disclosure. The specific quantity of the discrimination network may be the same as the quantity of the result images output by the generative network. Each discrimination network receives one result image of the generative network, and discriminates the result image, and thus all the result images output by the generative network are discriminated.

In one example, the three discrimination networks may be adopted to respectively receive the first result image, the second result image and the third result image output by the generative network. In a process for training the image processing model, the plurality of discrimination networks are adopted to constrain the first result image, the second result image and the third result image output by the generative network.

Specific applications of the image processing model provided by the embodiment of the present disclosure in the image processing process and the process for training will be described in detail in the subsequent embodiments with reference to an image processing method and a method for training the image processing model.

Figure 7:
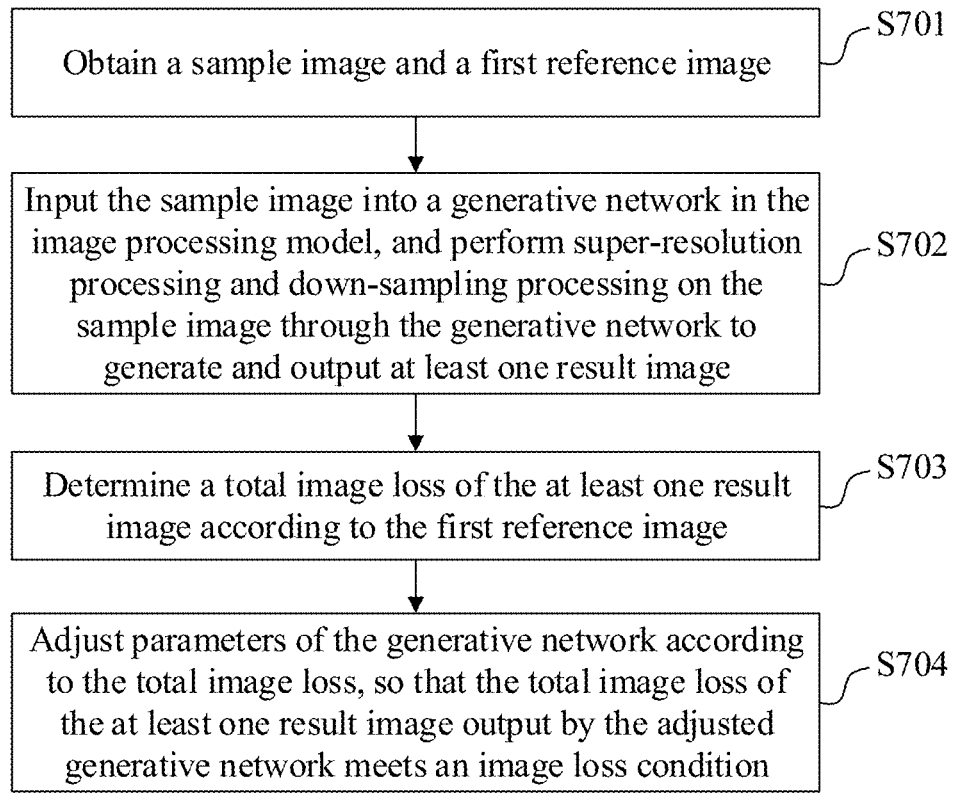
FIG. 7 is a schematic flow diagram of a method for training an image processing model provided by an embodiment of the present disclosure.

An embodiment of the present disclosure provides a method for training an image processing model. As shown in FIG. 7, the method includes the following.

S701, a sample image and a first reference image are obtained.

In the embodiment of the present disclosure, an information quantity and a resolution of the sample image are lower than an information quantity and a resolution of the first reference image, respectively.

In the specific example hereafter, the sample image with the relatively low information quantity and resolution is called a low quality low resolution image, and the first reference image with the relatively high information quantity and resolution is called a high quality high resolution image.

S702, the sample image is input into a generative network in the image processing model, and super-resolution processing and down-sampling processing are performed on the sample image through the generative network, so as to generate and output at least one result image.

In one possible implementation, when the generative network includes a first super-resolution sub-network, a down-sampling sub-network and a second super-resolution sub-network cascaded sequentially, the sample image is input into the first super-resolution sub-network, and the super-resolution processing is performed on the sample image through the first super-resolution sub-network so as to obtain a first feature image; the down-sampling processing is performed on the first feature image through the down-sampling sub-network so as to obtain at least one second feature image, and the super-resolution processing is performed on the second feature image through the second super-resolution sub-network so as to obtain and output a first result image. A resolution of the first feature image is higher than the resolution of the sample image, a resolution of the second feature image is lower than the resolution of the first feature image, and a resolution of the first result image is higher than the resolution of the second feature image.

Cascade relationships and specific structures of the first super-resolution sub-network, the down-sampling sub-network and the second super-resolution sub-network are as previously mentioned, which is not repeated here.

Based on the above mode, it can be seen with reference to FIG. 4 or FIG. 5, in the embodiment of the present disclosure the super-resolution processing (first-time super-resolution processing) may be performed on the input sample image through the first super-resolution sub-network, so as to obtain a high resolution image (namely, the first feature image, and the image is called the high resolution image relative to the sample image); the down-sampling processing may be performed on the first feature image through the down-sampling sub-network so as to obtain a low resolution image (namely, the second feature image, and the image is called the low resolution image relative to the first feature image); and then the super-resolution processing (second-time super-resolution processing) may be performed on the second feature image through the second super-resolution sub-network so as to obtain and output a high resolution image (namely, the first result image Output, and the image is called the high resolution image relative to the sample image or the second feature image), so that the resolution of the sample image is increased.

Optionally, when the down-sampling sub-network includes the first down-sampling branch and the second down-sampling branch in parallel, the performing the down-sampling processing on the first feature image through the down-sampling sub-network so as to obtain the at least one second feature image, includes: the down-sampling processing is performed on the first feature image obtained by the first super-resolution sub-network through the first down-sampling branch so as to obtain one second feature image; and the down-sampling processing is performed on the first feature image obtained by the first super-resolution sub-network through the second down-sampling branch so as to obtain another second feature image. An information quantity of the second feature image obtained by the second down-sampling branch is greater than an information quantity of the second feature image obtained by the first down-sampling branch.

The structures of the first down-sampling branch and the second down-sampling branch are as previously mentioned, which is not repeated here.

According to the embodiment of the present disclosure, by setting the second down-sampling branch, the second feature image with the relatively high information quantity may be obtained, and jointly serve as input of the second super-resolution sub-network together with the second feature image obtained by the first down-sampling branch. The second feature image output by the second down-sampling branch may make up the defect of insufficient information quantity of the second feature image output by the first down-sampling branch, and improves image feature information of the image input into the second super-resolution sub-network, so that the second super-resolution sub-network reserves the image feature information as much as possible when outputting a final result, an information quantity of the final result (namely the first result image) is increased, definition of processed images is improved, and the high quality high resolution image is obtained.

In another optional implementation, as shown in FIG. 5, when the generative network further includes a first feature extraction sub-network and a second feature extraction sub-network, feature extraction is performed on the first feature image through the first feature extraction sub-network so as to obtain and output a second result image O_tmp1; and the feature extraction is performed on the second feature image through the second feature extraction sub-network so as to obtain and output a third result image O_tmp2.

In further another optional implementation, when the generative network includes a first feature extraction sub-network, feature extraction is performed on the first feature image through the first feature extraction sub-network so as to obtain and output a second result image; and when the generative network includes a second feature extraction sub-network, the feature extraction is performed on the second feature image through the second feature extraction sub-network so as to obtain and output a third result image.

Cascade modes and specific structures of the first feature extraction sub-network and/or the second feature extraction sub-network are as previously mentioned, which is not repeated here.

The two result images or any result image output through the first feature extraction sub-network and/or the second feature extraction sub-network may both be configured to calculate a total image loss (a calculation mode will be described in detail in the subsequent embodiment) of the image output by the generative network, so that multiscale constraint is achieved, and training fineness is improved, thereby improving the quality of the trained image processing model.

S703, a total image loss of the at least one result image is determined according to the first reference image.

In one optional implementation, when the generative network includes the first super-resolution sub-network, the down-sampling sub-network and the second super-resolution sub-network sequentially cascaded, a first image loss of the first result image is determined according to the first reference image to serve as the total image loss.

In another optional implementation, when the generative network further includes the first feature extraction sub-network and the second feature extraction sub-network, a second reference image is generated according to the first reference image; and a total image loss of the first result image, the second result image and the third result image is determined according to the first reference image and the second reference image.

Optionally, a first image loss of the first result image and a second image loss of the second result image are determined according to the first reference image, a third image loss of the third result image is determined according to the second reference image, and the total image loss is determined according to the first image loss, the second image loss and the third image loss.

In further another optional implementation, when the generative network includes the first feature extraction sub-network, a total image loss of the first result image and the second result image is determined according to the first reference image; and when the generative network includes the second feature extraction sub-network, a second reference image is generated according to the first reference image, and a total image loss of the first result image and the third result image is determined according to the first reference image and the second reference image.

Optionally, when the generative network includes the first feature extraction sub-network, a first image loss of the first result image and a second image loss of the second result image are determined according to the first reference image, and the total image loss is determined according to the first image loss and the second image loss; and when the generative network includes the second feature extraction sub-network, the first image loss of the first result image is determined according to the first reference image, a third image loss of the third result image is determined according to the second reference image, and the total image loss is determined according to the first image loss and the third image loss.

Optionally, the generating the second reference image according to the first reference image includes: the down-sampling processing is performed on the first reference image so as to obtain the second reference image. An information quantity of the second reference image is the same as an information quantity of the first reference image, a resolution of the second reference image is lower than a resolution of the first reference image, and a size of the first reference image is the same as a size of the sample image.

The first reference image and the second reference image may be both stored in a data set for convenient subsequent calling.

Optionally, the total image loss includes: at least one of a content loss, an against loss, a weighted L1 loss or an eye region loss. Optionally, each of the first image loss, the second image loss and the third image loss may include: at least one of the content loss, the against loss, the weighted L1 loss or the eye region loss.

Optionally, when the total image loss includes at least one of the weighted L1 loss or the eye region loss, the determining the total image loss of the at least one result image according to the first reference image includes at least one of the following loss determination modes.

Mode 1: the weighted L1 loss is determined according to a difference between a pixel value of the at least one result image and a pixel value of the first reference image; and mode 2: the eye region loss is determined according to the content loss of an eye region in the at least one result image and an eye region in the first reference image.

Optionally, the determining the eye region loss according to the content loss of the eye region in the at least one result image and the eye region in the first reference image includes the following. As for each result image, a content loss of a total eye region in the result image and a total eye region in the first reference image and a content loss of a first eye region and a second eye region in the result image are respectively determined to serve as a total content loss and a result image content loss; a content loss of a first eye region and a second eye region in the first reference image is determined to serve as a reference image content loss; and the eye region loss of the result image and the first reference image is determined according to the total content loss, the result image content loss and the reference image content loss.

In the result image and the first reference image, the total eye region includes the first eye region and the second eye region, and the first eye region and the second eye region do not overlap with each other.

In one optional implementation, the first eye region may be a left half region in the total eye region, the second eye region may be a right half region in the total eye region, and division of the left half region and the right half region may refer to a relevant content of the aforementioned expression (5). That is, as for the total eye region with a height being h and a width being w, a region from 0 to 0.5w calculated from left to right serves as the left half region, and a region from 0.5w to w serves as the right half region. Calculation or division may also be performed from right to left.

In another optional implementation, the first eye region may be an upper half region in the total eye region, the second eye region may be a lower half region in the total eye region, and division of the upper half region and the lower half region may be in the following modes. As for the total eye region with a height being h and a width being w, a region from 0 to 0.5h calculated from top to bottom serves as the upper half region, and a region from 0.5h to h serves as the lower half region. When this kind of division mode is adopted, a calculation mode of the eye region loss may still adopt the mode of the expression (5), and w in the expression (5) is changed into h. Calculation and division may also be performed from bottom to top.

In other optional implementation, division of the first eye region and the second eye region may further adopt other division modes according to actual demand. For example, the left half region and the right half region are not in an equal division mode taking 0.5w as a boundary and are divided in a certain proportion, which is not listed one by one here.

The left, right, upper and lower in the embodiment of the present disclosure are subjected to an angle that human eyes observe images on a paper or a display interface.

In one possible implementation, the determining the eye region loss of the result image and the first reference image according to the total content loss, the result image content loss and the reference image content loss includes: a sum of the total content loss, the result image content loss and the reference image content loss serves as the eye region loss of the result images and the first reference image.

Figure 8:
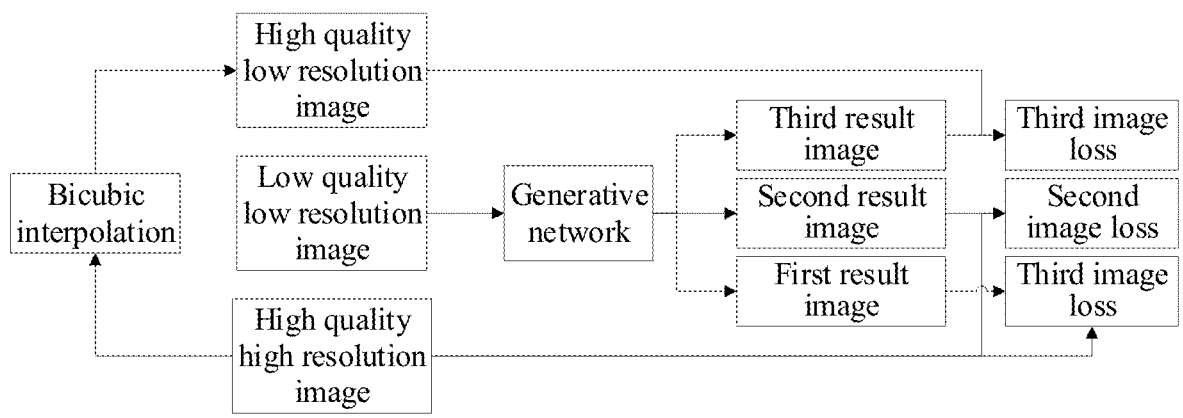
FIG. 8 is part of a schematic principle diagram for training a generative network in an embodiment of the present disclosure.

FIG. 8 shows some training principles for training a generative network (Generator). The determination mode of the total image loss is further introduced below with reference to FIG. 8. In FIG. 8, a low quality low resolution is the sample image, a high quality high resolution is the first reference image, and a high quality low resolution is the second reference image.

In an example of FIG. 8, the low quality low resolution image in input into the generative network Generator so as to be able to obtain three output images, namely, the first result image Output output by the second super-resolution sub-network, the second result image Output_tmp1 output by a first feature extraction sub-network, and the third result image Output_tmp2 output by a second feature extraction sub-network respectively.

As for Output and Output_tmp1, the first image loss Loss_out of Output and the second image loss Loss_tmp_1 of Output_tmp1 may be respectively calculated according to the high quality high resolution image.

As for Output_tmp2, after down-sampling is performed on the high quality high resolution image through a bicubic interpolation BICUBIC method, the high quality low resolution image with the size being equal to a size of the low quality low resolution image may be obtained, and the third image loss Loss_tmp_2 of Output_tmp2 may be calculated according to the high quality low resolution image.

The calculated Loss_out, Loss_tmp_1 and Loss_tmp_2 may each include at least one of the content loss, the against loss, the weighted L loss and the eye region loss. Specific calculation methods of the four losses may refer to relevant contents of the aforementioned expression (1) and the expressions (3)-(5), which are not repeated here. When the expression (3) is applied to the embodiment of the present disclosure, the first reference image may serve as a "true" sample set Pdata.

Taking an example of simultaneously containing the above four losses, the first image loss may obtained through the following modes:

$$\text{loss\_out} = a*L_{content}(hh,\text{output}) + b*L\_G(\text{output}) + c*L1(hh,\text{output}) + d*L_{eye}(hh_{eye},\text{output}_{eye}) \quad \text{Expression (6)}.$$

The second image loss may be obtained through the following modes:

$$\text{loss\_tmp\_1} = a*L_{content}(hh,\text{output\_tmp1}) + b*L\_G(\text{output\_tmp1}) + c*L1(hh,\text{out\_tmp1}) + d*L_{eye}(hh_{eye},\text{out\_tmp1}_{eye}) \quad \text{Expression (7)}.$$

The third image loss may be obtained through the following modes:

$$\text{loss\_tmp\_2} = a*L_{content}(hl, \text{output\_tmp2}) + b*L\_G(\text{output\_tmp2}) + c*L1(hl, \text{out\_tmp2}) + d*L_{eye}(hl_{eye}, \text{out\_tmp2}_{eye}) \quad \text{Expression (8).}$$

In the expressions (6)-(8), hh represents the high quality high resolution image, hl represents the high quality low resolution image, $hh_{eye}$ represents an eye region image in the high quality high resolution image, $hl_{eye}$ represents an eye region image in the high quality low resolution image, $\text{output}_{eye}$, $\text{out\_tmp1}_{eye}$ and $\text{out\_tmp2}_{eye}$ respectively represent eye region images in the corresponding result images, and a, b, c and d are respectively weight parameters of the content loss $L_{content}$, the against loss $L\_G$, the weighted L1 loss L1 and the eye region loss $L_{eye}$.

The total image loss LOSS may be calculated through the following modes:

$$\text{LOSS} = \alpha*\text{loss\_out} + \beta*\text{loss\_tmp\_1} + \gamma*\text{loss\_tmp\_2} \quad \text{Expression (9).}$$

In the expression (9), $\alpha$, $\beta$ and $\gamma$ are respectively weight parameters of oss_out, oss_tmp_1 and loss_tmp_2.

The weight parameters in the embodiment of the present disclosure may be set according to the actual demands.

S704, parameters of the generative network are adjusted according to the total image loss, so that the total image loss of the at least one result image output by the adjusted generative network meets an image loss condition.

The image loss condition in the embodiment of the present disclosure may be set according to the actual demands. For example, a loss threshold is set according to the actual demands, and if the total image loss is smaller than the loss threshold, it is considered that the total image loss meets the image loss condition.

Figure 9:
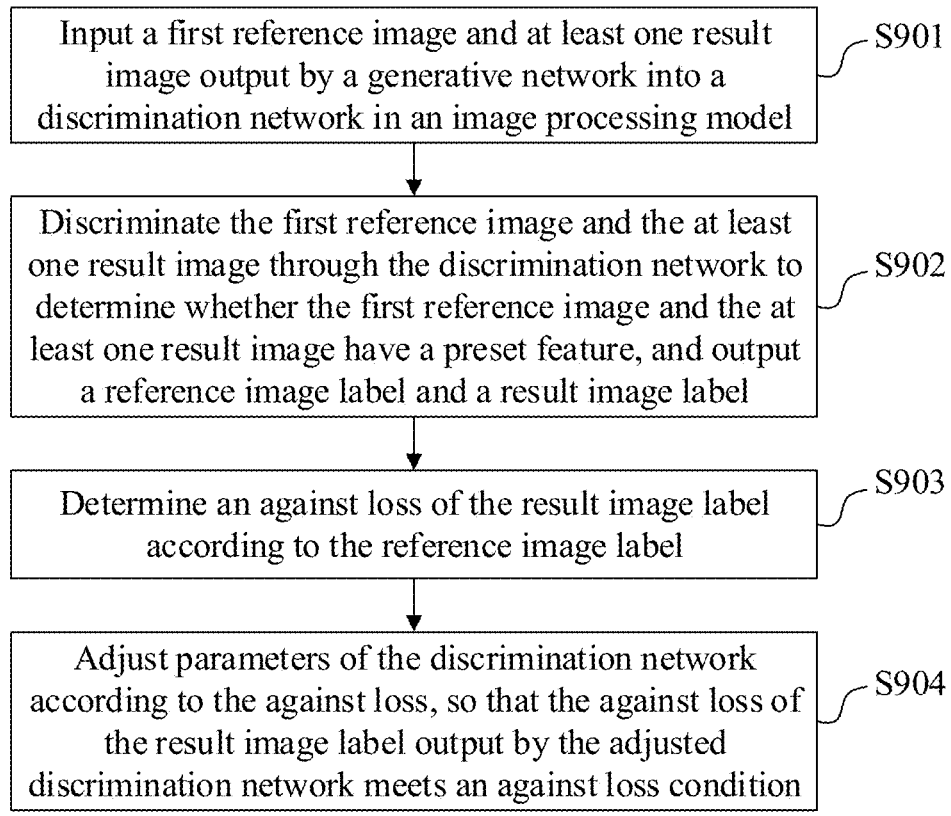
FIG. 9 is part of a schematic flow diagram of another method for training an image processing model provided by an embodiment of the present disclosure.

Optionally, as shown in FIG. 9, the method for training the image processing model provided by the embodiment of the present disclosure further includes the following steps S901-S904.

S901, the first reference image and the at least one result image output by the generative network are input into a discrimination network in the image processing model.

Optionally, as for the two or more discrimination networks, the first reference image is input into all the discrimination networks, and each result image output by the generative network is input into the corresponding discrimination network.

S902, the first reference image and the at least one result image are discriminated through the discrimination network to determine whether the first reference image and the at least one result image have a preset feature, and a reference image label and a result image label are output.

The reference image label represents a discriminating result on the first reference image, and the result image label represents a discriminating result on the at least one result image.

Optionally, as for the two or more discrimination networks, the first reference image and one result image input into the discrimination network are discriminated through each discrimination network to determine whether the first reference image and the input result image have a preset feature.

S903, the against loss of the result image label is determined according to the reference image label.

Optionally, the against loss of the result image label is determined through a loss build module according to the reference image label. A principle of calculating the against loss through the loss build module may refer to the relevant content of the aforementioned expression (2), which is not repeated here.

S904, parameters of the discrimination network are adjusted according to the against loss, so that an against loss of a result image label output by the adjusted discrimination network meets an against loss condition.

Optionally, the parameters of the discrimination network are adjusted through an optimizer according to the against loss. The optimizer may be an optimizer based on any algorithm in a plurality of existing optimization algorithms. The plurality of optimization algorithms include a Stochastic Gradient Descent (SGD) method, a Batch Gradient Descent (BGD) method, an ADAM or the like.

Figure 10:
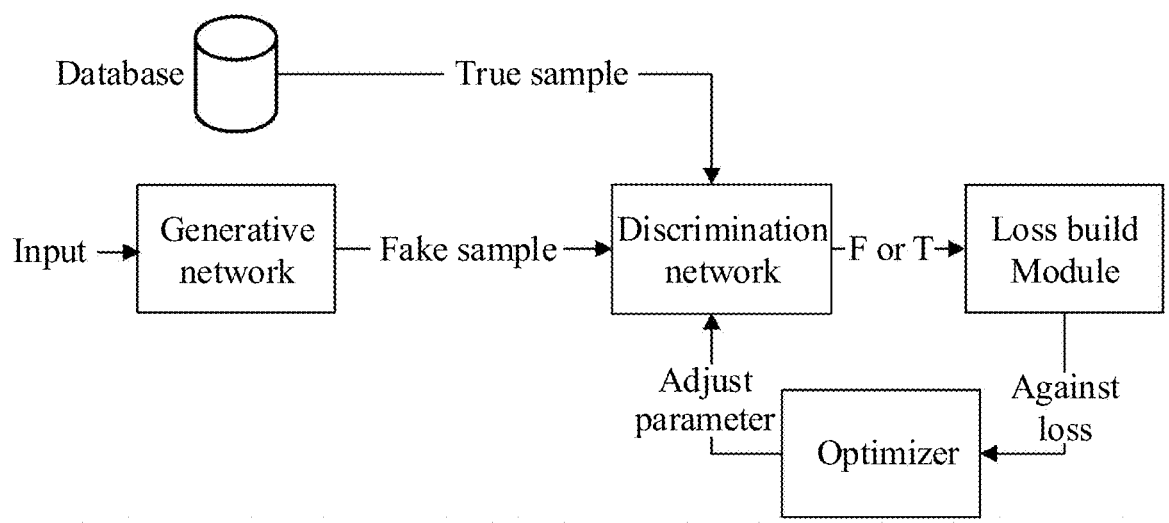
FIG. 10 is part of a schematic principle diagram for training a discrimination network in an embodiment of the present disclosure.

FIG. 10 shows a mode for training the discrimination network. As shown in FIG. 10, the result images output by the generative network (Generator) serve as fake samples to be input into the corresponding discrimination networks (Discriminator) so as to obtain fake labels (F) output by the discrimination network; high quality high resolution images in a database (dataset) serve as true samples to be input into the same discrimination network so as to obtain true labels (T) output by the corresponding discrimination network; and the true labels and the fake labels output by the discrimination network generate the against loss Loss through the loss build module, and then the parameters of the discrimination network are adjusted through the optimizer (optimization).

Optionally, the image processing method provided by the embodiment of the present disclosure may further include: the trained image processing model is deployed on a target device.

Figure 11:
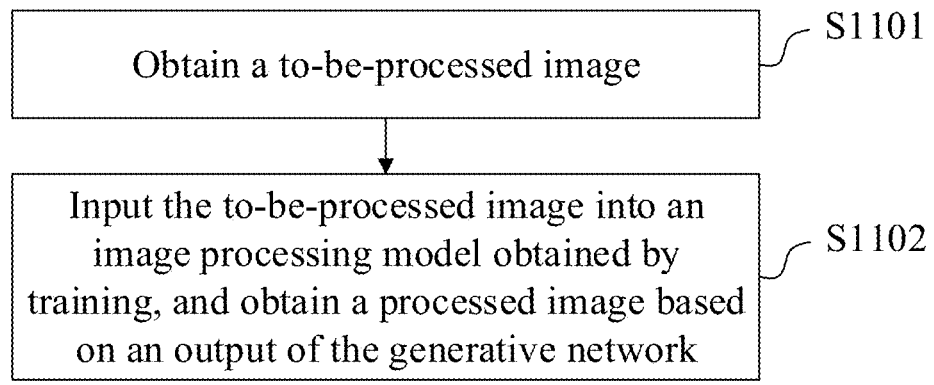
FIG. 11 is a schematic flow diagram of an image processing method provided by an embodiment of the present disclosure.

Based on the same inventive concept, an embodiment of the present disclosure provides an image processing method. As shown in FIG. 11, the image processing method includes the following.

S1101, a to-be-processed image is obtained.

The to-be-processed image may be a face image, or other images, such as an item image and a scenery image.

S1102, the to-be-processed image is input into an image processing model obtained by training, the image processing model includes a generative network, and a processed image is obtained based on an output of the generative network.

The image processing model in the embodiment of the present disclosure is obtained by training through any method for training the image processing model provided by the embodiment of the present disclosure.

Optionally, in the image processing method provided by the embodiment of the present disclosure, the generative network may include a first super-resolution sub-network, a down-sampling sub-network and a second super-resolution sub-network sequentially cascaded.

The to-be-processed image is input into the first super-resolution sub-network, and super-resolution processing is performed on the to-be-processed image through the first super-resolution sub-network so as to obtain a first feature image.

Down-sampling processing is performed on the first feature image through a down-sampling sub-network so as to obtain at least one second feature image.

The super-resolution processing is performed on the second feature images through a second super-resolution sub-network so as to generate and output a first result image, wherein the first result image is a final result image output by the generative network.

Optionally, in the image processing method provided by the embodiment of the present disclosure, a down-sampling sub-network may include a first down-sampling branch and a second down-sampling branch in parallel.

The performing the down-sampling processing on the first feature image through the down-sampling sub-network so as to obtain the at least one second feature image, includes: the down-sampling processing is performed on the first feature image through the first down-sampling branch so as to obtain one second feature image; and the down-sampling processing is performed on the first feature image through the second down-sampling branch so as to obtain another second feature image. An information quantity of the second feature image obtained through the second down-sampling branch is greater than an information quantity of the second feature image obtained through the first down-sampling branch.

Optionally, the image processing method provided by the embodiment of the present disclosure further includes: an image label of the processed image is obtained based on an output of a discrimination network in the image processing model. The image label represents whether the processed image has a preset feature.

The trained image processing model adopted by the embodiment of the present disclosure is high in image processing capability. Based on the image processing model, by adopting the image processing method provided by the embodiment of the present disclosure, finer image processing may be performed on an original image so as to obtain the processed image with the high visual quality.

Figure 12:
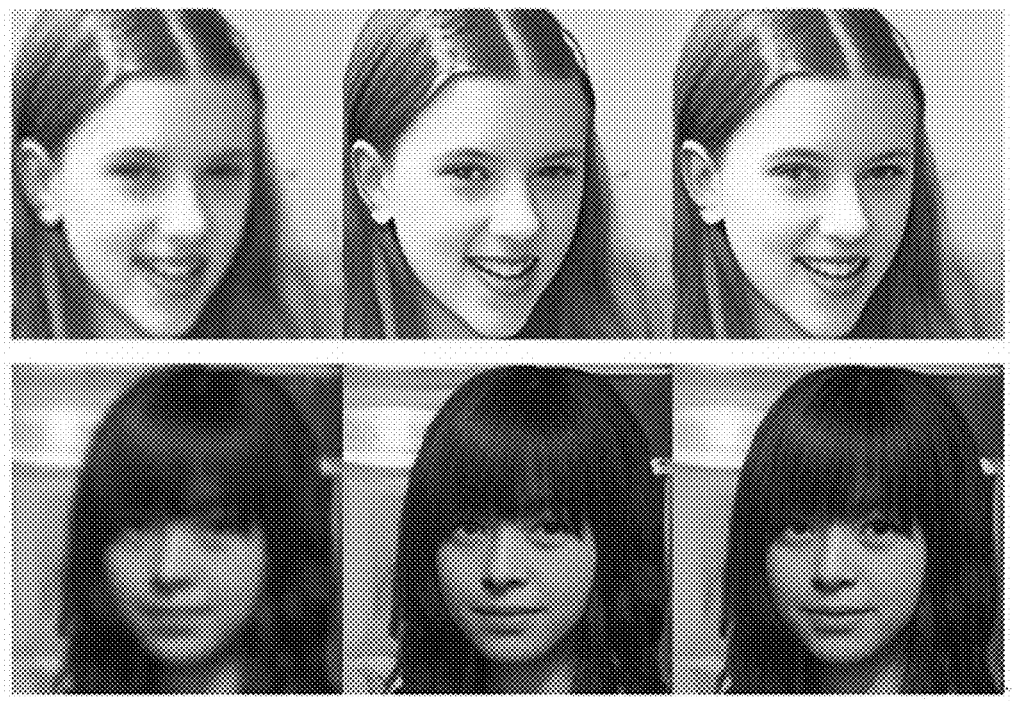
FIG. 12 is a schematic effect diagram of image processing by adopting an image processing method provided by an embodiment of the present disclosure.

Taking sharpening processing of the face image as an example, after the image processing method of the embodiment of the present disclosure is adopted to perform sharpening processing on the original image, a visual effect of the output processed image is as shown in FIG. 12. It can be seen from FIG. 12 that definition of the image processed by adopting the image processing method according to the embodiment of the present disclosure is significantly improved compared with definition of the original image. Compared with the definition of the image processed through the related art, the image processed by adopting the image processing method according to the embodiment of the present disclosure is higher in definition. It can be seen that the image processing method according to the embodiment of the present disclosure has the better effect of sharpening processing on the face image.

Figure 13:
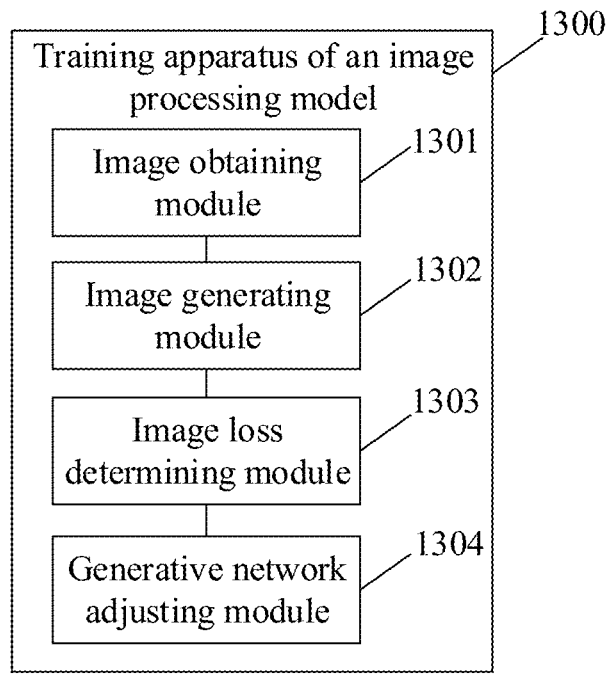
FIG. 13 is a schematic framework diagram of a training apparatus of an image processing model provided by an embodiment of the present disclosure.

Based on the same inventive concept, an embodiment of the present disclosure provides a training apparatus of an image processing model. As shown in FIG. 13, the training apparatus includes: an image obtaining module 1301, an image generating module 1302, an image loss determining module 1303 and a generative network adjusting module 1304.

The image obtaining module 1301 is configured to obtain a sample image and a first reference image. An image quality and an image resolution of the sample image are lower than an image quality and an image resolution of the first reference image, respectively.

The image generating module 1302 is configured to input the sample image into a generative network in the image processing model, and perform super-resolution processing and down-sampling processing on the sample image through the generative network, so as to generate and output at least one result image.

The image loss determining module 1303 is configured to determine a total image loss of the at least one result image according to the first reference image.

The generative network adjusting module 1304 is configured to adjust parameters of the generative network according to the total image loss, so that the total image loss of the at least one result image output by the adjusted generative network meets an image loss condition.

In one possible implementation, the image generating module 1302 is specifically configured to: input the sample image into a first super-resolution sub-network in the generative network, and perform super-resolution processing on the sample image through the first super-resolution sub-network so as to obtain a first feature image, wherein a resolution of the first feature image is higher than a resolution of the sample image; perform down-sampling processing on the first feature image through a down-sampling sub-network in the generative network so as to obtain at least one second first feature image, wherein a resolution of the second feature image is lower than a resolution of the first feature image; and perform the super-resolution processing on the second feature image through the second super-resolution sub-network in the generative network so as to obtain and output a first result image, wherein a resolution of the first result image is higher than a resolution of the second feature image.

Optionally, the image generating module 1302 is specifically configured to: perform the down-sampling processing on the first feature image through a first down-sampling branch in the down-sampling sub-network so as to obtain one second feature image; and perform the down-sampling processing on the first feature image through a second down-sampling branch in the down-sampling sub-network so as to obtain another second feature image. An information quantity of the second feature image obtained through the second down-sampling branch is greater than an information quantity of the second feature image obtained through the first down-sampling branch.

In another optional implementation, the image generating module 1302 is specifically configured to: perform feature extraction on the first feature image through a first feature extraction sub-network in the generative network so as to obtain and output a second result image; and perform the feature extraction on the second feature image through the second feature extraction sub-network in the generative network so as to obtain and output a third result image.

In further another optional implementation, the image generating module 1302 is specifically configured to: perform feature extraction on the first feature image through the first feature extraction sub-network so as to obtain and output a second result image; or perform the feature extraction on the second feature image through the second feature extraction sub-network so as to obtain and output a third result image.

In one optional implementation, the image loss determining module 1303 is specifically configured to: determine a first image loss of the first result image as the total image loss according to the first reference image.

In another optional implementation, the image loss determining module 1303 is specifically configured to: generate a second reference image according to the first reference image; and determine a total image loss of the first result image, the second result image and the third result image according to the first reference image and the second reference image.

In further another optional implementation, the image loss determining module 1303 is specifically configured to: determine a total image loss of the first result image and the second result image according to the first reference image; or generate a second reference image according to the first reference image, and determine a total image loss of the first result image and the third result image according to the first reference image and the second reference image.

Optionally, the image loss determining module 1303 is specifically configured to execute at least one of the following loss determination modes when the total image loss includes at least one of a weighted L1 loss and an eye region loss: mode 1, determining the weighted L1 loss according to a difference between a pixel value of the at least one result image and a pixel value of the first reference image; and mode 2, determining the eye region loss according to the content loss of an eye region in the at least one result image and an eye region in the first reference image.

Optionally, the image loss determining module 1303 is specifically configured to: for each result image, determine a content loss of a total eye region in the result image and a total eye region in the first reference image, and a content loss of a first eye region and a second eye region in the result image to serve as a total content loss and a result image content loss, respectively; determine a content loss of a first eye region and a second eye region in the first reference image to serve as a reference image content loss; and determine the eye region loss of the result image and the first reference image according to the total content loss, the result image content loss and the reference image content loss. In the result images and the first reference image, the total eye regions include the first eye regions and the second eye regions, and the first eye regions do not overlap with the second eye regions.

Optionally, the training apparatus of the image processing model provided by the embodiment of the present disclosure further includes: an image discriminating module, a label loss determining module and a discrimination network adjusting module.

The image discriminating module is configured to: input the first reference image and the at least one result image into a discrimination network in the image processing model, discriminate the first reference image and the at least one result image through the discrimination network so as to determine whether the first reference image and the at least one result image have a preset feature, and output a reference image label and a result image label. The reference image label represents a discriminating result for the first reference image, and the result image label represents a discriminating result for the at least one result image. The label loss determining module is configured to: determine an against loss of the result image label according to the result image label. The discrimination network adjusting module is configured to: adjust parameters of the discrimination network according to the against loss, so that the against loss of the result image label output by the adjusted discrimination network meets an against loss condition.

Figure 14:
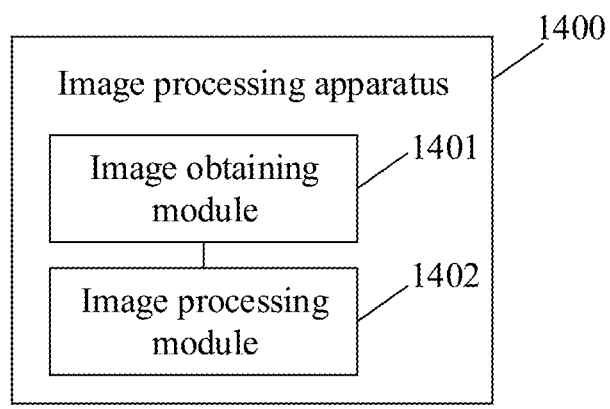
FIG. 14 is a schematic framework diagram of an image processing apparatus provided by an embodiment of the present disclosure.

Based on the same inventive concept, an embodiment of the present disclosure provides an image processing apparatus. As shown in FIG. 14, the image processing apparatus 1400 includes: an image obtaining module 1401 and an image processing module 1402.

The image obtaining module 1401 is configured to obtain a to-be-processed image.

The image processing module 1402 is configured to input the to-be-processed image into an image processing model, and obtain a processed image based on output of a generative network in the image processing model. The image processing model is obtained by training through any method for training the image processing model provided by the embodiment of the present disclosure, and the method may refer to the aforementioned embodiment, which is not repeated here.

Optionally, the image processing apparatus provided by the embodiment of the present disclosure further includes: an image discrimination module. The image discrimination module is configured to: obtain an image label of the processed image based on an output of a discrimination network in the image processing model. The image label represents whether the processed image has a preset feature.

The training apparatus 1300 of the image processing model provided by the embodiment of the present disclosure may execute any method for training the image processing model provided by the embodiment of the present disclosure, the image processing apparatus 1400 provided by the embodiment of the present disclosure may execute any image processing method provided by the embodiment of the present disclosure, and their implementation principles are similar. The contents not shown in detail in the present embodiment may refer to all the foregoing embodiments, which is not repeated here.

Based on the same inventive concept, an embodiment of the present disclosure provides an image processing device. The image processing device includes: a memory and a processor. The memory is electrically connected with the processor.

The memory stores a computer program, and the computer program is executed by the processor so as to implement any image processing method, and/or, any method for training the image processing model provided by the embodiment of the present disclosure.

Those skilled in the art may understand that the image processing device provided by the embodiment of the present disclosure may be specially designed and manufactured for the desired purpose, or may include known devices in a general-purpose computer. These devices have computer programs stored therein, and these computer programs are selectively activated or reconstructed. Such computer programs may be stored in a device (such as a computer) readable medium or stored in any type of mediums suitable for storing electronic instructions and respectively coupled to a bus.

Figure 15:
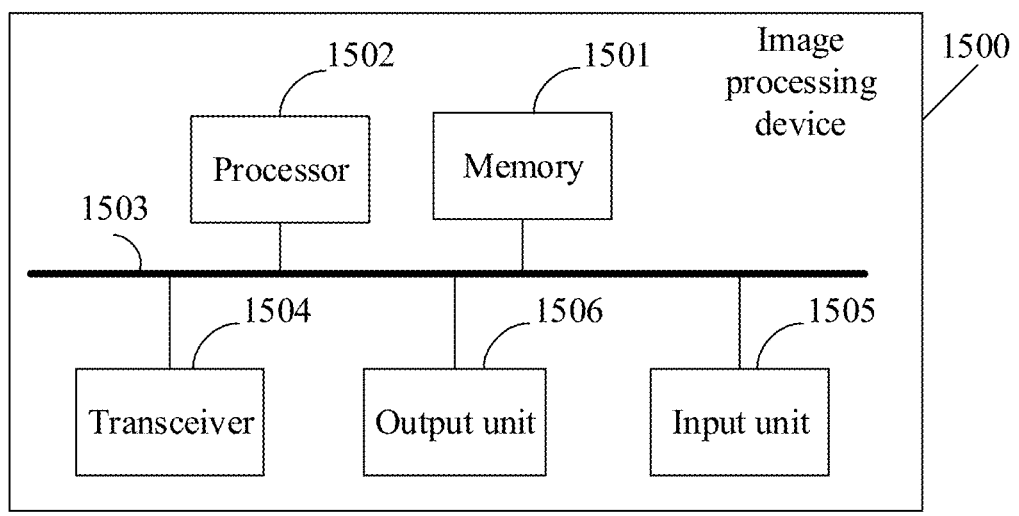
FIG. 15 is a schematic framework diagram of an image processing device provided by an embodiment of the present disclosure.

The present disclosure provides an image processing device in an optional embodiment. As shown in FIG. 15, the image processing device 1500 includes: a memory 1501 and a processor 1502. The memory 1501 is electrically connected with the processor 1502, for example, through a bus 1503.

The memory 1501 may be a Read-Only Memory (ROM) or other types of static storage devices capable of storing static information and instructions, may be a Random Access Memory (RAM) or other types of dynamic storage devices capable of storing information and instructions, may also be an Electrically Erasable Programmable Read Only Memory (EEPROM), a Compact Disc Read-Only Memory (CD-ROM) or other compact disc storage, optical disc storage (including a compression optical disc, a laser optical disc, an optical disc, a digital universal optical, a blu-ray disc and the like) and disk storage mediums or other magnetic storage devices, or any other mediums capable of being configured to store expected program codes with instruction or data structure forms and capable of being accessed by a computer, but is not limited to this.

The processor 1502 may be a Central Processing Unit (CPU), a general-purpose processor, a Digital Signal Processor (DSP), an Application Specific Integrated Circuit (ASIC), a Field-Programmable Gate Array (FPGA) or other programmable logic devices, transistor logic devices, hardware components or any combination thereof. The memory may implement or execute various exemplary logic blocks, modules and circuits described with reference to the contents disclosed by the present disclosure. The processor 802 may also be a combination implementing a calculation function, for example, a combination containing one or more microprocessors, a combination of DSP and the microprocessor, etc.

The bus 1503 may include a path for transmitting information among the above components. The bus may be a Peripheral Component Interconnect (PCI) bus, or an Extended Industry Standard Architecture (EISA) bus. The bus may be divided into an address bus, a data bus, control bus, etc. For facilitating representation, the bus is only represented with a thick line in FIG. 5, but it does not represent that there is only one bus or any type of buses.

Optionally, the image processing device 1500 may further include a transceiver 1504. The transceiver 1504 may be configured to receive and send signals. The transceiver 1504 may allow the image processing device 1500 to be in wireless or wired communication with other devices to swap data. It should be noted that the transceiver 1504 is not limited to be one in actual application.

Optionally, the image processing device 1500 may further include an input unit 1505. The input unit 1505 may be configured to receive input digital, character, image and/or sound information, or generate a key signal input relevant to user setting and functional control of the image processing device 1500. The input unit 1505 may include but is not limited to one or more of a touch screen, physical keyboard, function keys (such as a volume control key and an on/off key), a trackball, a mouse, an operating lever, a shooting apparatus, a pickup, etc.

Optionally, the image processing device 1500 may further include an output unit 1506. The output unit 1506 may be configured to output or display information processed via the processor 1502. The output unit 1506 may include but is not limited to one or more of a display apparatus, a loudspeaker, a vibration apparatus, etc.

Although FIG. 15 shows the image processing device 1500 with various apparatuses, it should be understood that it does not require to implement or have all the shown apparatuses. More or less apparatuses may be implemented or possessed alternatively.

Optionally, the memory 1501 is configured to store and execute application program codes of the solution of the present disclosure, and the processor 1502 controls execution. The processor 1502 is configured to execute the application program codes stored in the memory 1501, so as to implement any method for training the image processing model provided by the embodiment of the present disclosure.

The image processing device provided by the embodiment of the present disclosure has the same inventive concept with all the foregoing embodiments. The contents not shown in detail in the image processing device may refer to all the foregoing embodiments, which is not repeated here.

Based on the same inventive concept, an embodiment of the present disclosure provides a non-transitory computer readable storage medium. The non-transitory computer readable storage medium stores a computer program, and the computer program, when executed by a processor, implements any image processing method, and/or, any method for training an image processing model provided by the embodiment of the present disclosure.

The non-transitory computer readable storage medium includes but is not limited to any type of discs (including a floppy disc, a hard disc, a compact disc, a CD-ROM and a magnetic optical disc), a ROM, a RAM, an Erasable Programmable Read-Only Memory (EPROM), an EEPROM, a flash memory, a magnetic card or a light card. That is, the readable medium includes any medium allowing a device (such as a computer) to store or transmit information in a readable form.

The embodiment of the present disclosure provides the non-transitory computer readable storage medium, suitable for various optional implementations of the above image processing method and/or the image processing model, which is not repeated here.

The non-transitory computer readable storage medium provided by the embodiment of the present disclosure has the same inventive concept with all the foregoing embodiments. The contents not shown in detail in the non-transitory computer readable storage medium may refer to all the foregoing embodiments, which is not repeated here.

By applying the embodiment of the present disclosure, the following beneficial effects may be at least achieved.

1) The embodiment of the present disclosure may train the whole image processing model. Compared with a mode of separately training all the models in the related art, a training mode of the embodiment of the present disclosure is simpler, more convenient and more efficient. The embodiment of the present disclosure may perform training based on at least one output of the generative network in the image processing model, the output total image loss may be determined more comprehensively and more precisely based on different outputs, the parameters of the generative network may be adjusted more precisely based on the total image loss, thereby improving the processing capability of the generative network on the input images, such as sharpening capability on the face images, and the images with the higher visual quality are output.

2) The embodiment of the present disclosure may respectively calculate the image loss for the plurality of outputs of the generative network in the training process, and then multiscale constraint based on the plurality of outputs is implemented according to the total image loss determined through all the output image losses. The image information in the original input image and processing process may be sufficiently utilized in the multiscale constraint mode, thereby improving the training quality of the generative network, so that the trained generative network has the higher image processing capability, and the visual quality of the images output by the generative network is significantly improved.

3) The down-sampling sub-network in the generative network of the embodiment of the present disclosure may include the two down-sampling branches. After the different down-sampling processing is performed on the first feature image output by the first super-resolution sub-network, the two second feature images with the different information quantities may be obtained, the two second feature images may complement each other, compared with a single input mode, the feature images input into the second super-resolution sub-network reserve the more information quantities, thus the output images of the second super-resolution sub-network have the more information quantities with the higher resolution, and the visual quality of the output images is good.

4) The second down-sampling branch in the embodiment of the present disclosure may implement cross-layer link, that is, the outputs of the first super-resolution sub-network are in direct link with the inputs of the second super-resolution sub-network, so as to implement lossless transmission of the feature information. Specifically, the second down-sampling branch adopts one down-sampling layer (such as the DEMUX layer) to perform lossless down-sampling processing on the first feature image, and the processed image is directly input into the second super-resolution sub-network without other processing. Relative to the multiple-layer convolution and down-sampling in the first down-sampling branch, the second down-sampling branch may reduce the information loss of the image to a great extent so as to better make up deficiency of the output images of the first down-sampling branch, so that the images input into the second super-resolution sub-network reserve the more information.

Those skilled in the art should understand that steps, measures and solutions in various operations, methods and flows discussed in the present disclosure may be alternated, changed, combined or deleted. Further, other steps, measures and solutions having various operations, methods and flows discussed in the present disclosure may also be alternated, changed, rearranged, decomposed, combined or deleted. Further, steps, measures and solutions having various operations, methods and flows disclosed in the present disclosure in the related art may also be alternated, changed, rearranged, decomposed, combined or deleted.

In the description of the present disclosure, it should be understood that the term "first" and "second" are only configured to describe the purpose, and cannot be understood as indicating or implying relative importance or implicitly indicating the quantity of the indicated technical features. Therefore, the features with the limited "first" and "second may explicitly or implicitly include one or more features. In the description of the present disclosure, unless otherwise noted, the meaning of "the plurality of" is two or more.

It should be understood that although all the steps in the flow diagrams of the drawings are sequentially shown according to arrow indication, these steps are not necessarily executed sequentially according to an order indicated by arrows. Unless expressly stated herein, execution of these steps has no strict order limitation, and these steps may be executed in other orders. Moreover, at least part of steps in the flow diagrams of the drawings may include a plurality of sub-steps or a plurality of stages, these sub-steps or stages are not necessarily executed and completed at the same moment, and may be executed at the different moments. The execution orders are not necessarily executed in sequence, and these sub-steps or stages may be alternately executed with other steps or at least part of the sub-steps or stages of other steps.

The above is only part of the implementation of the present disclosure. It should be noted that those skilled in the art should further make various improvements and embellishments without departing from the principle of the present disclosure, and these improvements and embellishments should also be regarded as the protection scope of the present disclosure.

What is claimed is:

1. A method for training an image processing model, wherein the image processing model comprises a generative network, and the method comprises:
    obtaining a sample image and a first reference image, wherein an information quantity and a resolution of the sample image are lower than an information quantity and a resolution of the first reference image, respectively;
    inputting the sample image into the generative network, and performing super-resolution processing and down-sampling processing on the sample image through the generative network to generate and output at least one result image;
    determining a total image loss of the at least one result image according to the first reference image; and
    adjusting parameters of the generative network according to the total image loss, so that a total image loss of at least one result image output by the adjusted generative network meets an image loss condition.

2. The method according to claim 1, wherein the generative network comprises a first super-resolution sub-network, a down-sampling sub-network and a second super-resolution sub-network sequentially cascaded; and
    the inputting the sample image into the generative network, and the performing the super-resolution processing and the down-sampling processing on the sample image through the generative network to generate and output the at least one result image, comprises:
    inputting the sample image into the first super-resolution sub-network, and performing the super-resolution processing on the sample image through the first super-resolution sub-network to obtain a first feature image, wherein a resolution of the first feature image is higher than the resolution of the sample image;
    performing the down-sampling processing on the first feature image through the down-sampling sub-network to obtain at least one second feature image, wherein a resolution of the second feature image is lower than the resolution of the first feature image; and
    performing the super-resolution processing on the second feature image through the second super-resolution sub-network to obtain and output a first result image, wherein a resolution of the first result image is higher than the resolution of the second feature image.

3. The method according to claim 2, wherein the down-sampling sub-network comprises a first down-sampling branch and a second down-sampling branch in parallel; and
    the performing the down-sampling processing on the first feature image through the down-sampling sub-network to obtain the at least one second feature image comprises:
    performing the down-sampling processing on the first feature image through the first down-sampling branch to obtain one second feature image; and
    performing the down-sampling processing on the first feature image through the second down-sampling branch to obtain another second feature image, wherein an information quantity of the second feature image obtained through the second down-sampling branch is greater than an information quantity of the second feature image obtained through the first down-sampling branch.

4. The method according to claim 2, wherein the generative network further comprises: a first feature extraction sub-network cascaded after the first super-resolution sub-network and a second feature extraction sub-network cascaded after the down-sampling sub-network;
    the inputting the sample image into the generative network, and the performing the super-resolution processing and the down-sampling processing on the sample image through the generative network to generate and output the at least one result image, further comprises:
    performing feature extraction on the first feature image through the first feature extraction sub-network to obtain and output a second result image; and performing feature extraction on the second feature image through the second feature extraction sub-network to obtain and output a third result image; and the determining the total image loss of the at least one result image according to the first reference image comprises:

generating a second reference image according to the first reference image; and determining a total image loss of the first result image, the second result image and the third result image according to the first reference image and the second reference image.

5. The method according to claim 2, wherein the generative network further comprises: a first feature extraction sub-network cascaded after the first super-resolution sub-network;

the inputting the sample image into the generative network of the image processing model, and the performing the super-resolution processing and the down-sampling processing on the sample image through the generative network to generate and output the at least one result image, further comprises:

performing feature extraction on the first feature image through the first feature extraction sub-network to obtain and output a second result image; and the determining the total image loss of the at least one result image according to the first reference image comprises:

determining a total image loss of the first result image and the second result image according to the first reference image.

6. The method according to claim 2, wherein the generative network further comprises: a second feature extraction sub-network cascaded after the down-sampling sub-network;

the inputting the sample image into the generative network of the image processing model, and the performing the super-resolution processing and the down-sampling processing on the sample image through the generative network to generate and output the at least one result image, further comprises:

performing feature extraction on the second feature image through the second feature extraction sub-network to obtain and output a third result image; and the determining the total image loss of the at least one result image according to the first reference image comprises:

generating a second reference image according to the first reference image, and determining a total image loss of the first result image and the third result image according to the first reference image and the second reference image.

7. The method according to claim 1, wherein the total image loss comprise: at least one of a content loss, an against loss, a weighted L1 loss or an eye region loss; and in a condition that the total image loss comprises at least one of the weighted L1 loss or the eye region loss, the determining the total image loss of the at least one result image according to the first reference image comprises at least one of following loss determination modes:

determining the weighted L1 loss according to a difference between a pixel value of the at least one result image and a pixel value of the first reference image; and determining the eye region loss according to a content loss of an eye region in the at least one result image and an eye region in the first reference image.

8. The method according to claim 7, wherein the determining the eye region loss according to the content loss of the eye region in the at least one result image and the eye region in the first reference image comprises:

for each result image, determining a content loss of a total eye region in the result image and a total eye region in the first reference image and a content loss of a first eye region and a second eye region in the result image to serve as a total content loss and a result image content loss, respectively;

determining a content loss of a first eye region and a second eye region in the first reference image to serve as a reference image loss, wherein in the result image and the first reference image, the total eye regions comprise the first eye regions and the second eye regions, and the first eye regions do not overlap with the second eye regions; and determining the eye region loss of the result image and the first reference image according to the total content loss, the result image loss and the reference image loss.

9. The method according to claim 1, further comprising:

inputting the first reference image and the at least one result image into a discrimination network in the image processing model;

discriminating the first reference image and the at least one result image through the discrimination network to determine whether the first reference image and the at least one result image have a preset feature, and outputting a reference image label and a result image label, wherein the reference image label represents a discriminating result on the first reference image, and the result image label represents a discriminating result on the at least one result image;

determining an against loss of the result image label according to the reference image label; and adjusting parameters of the discrimination network according to the against loss, so that an against loss of a result image label output by the adjusted discrimination network meets an against loss condition.

10. The method according to claim 1, further comprising: deploying the trained image processing model on a target device.

11. An image processing method, comprising:

obtaining a to-be-processed image; and inputting the to-be-processed image into an image processing model obtained by the method according to claim 1, wherein the image processing model comprises a generative network, and obtaining a processed image based on an output of the generative network.

12. An apparatus for training an image processing model, comprising:

a memory, storing a computer program; and a processor, electrically connected with the memory, wherein the processor is configured to execute the computer program to perform the method according to claim 1.

13. The method according to claim 12, wherein the generative network comprises a first super-resolution sub-network, a down-sampling sub-network and a second super-resolution sub-network sequentially cascaded; and wherein the processor is further configured to execute the computer program to:

input the sample image into the first super-resolution sub-network, and perform the super-resolution processing on the sample image through the first super-resolution sub-network to obtain a first feature image, wherein a resolution of the first feature image is higher than the resolution of the sample image;

perform the down-sampling processing on the first feature image through the down-sampling sub-network to obtain at least one second feature image, wherein a resolution of the second feature image is lower than the resolution of the first feature image; and perform the super-resolution processing on the second feature image through the second super-resolution sub-network to obtain and output a first result image, wherein a resolution of the first result image is higher than the resolution of the second feature image.

14. The method according to claim 13, wherein the down-sampling sub-network comprises a first down-sampling branch and a second down-sampling branch in parallel; and wherein the processor is further configured to execute the computer program to:

perform the down-sampling processing on the first feature image through the first down-sampling branch to obtain one second feature image; and perform the down-sampling processing on the first feature image through the second down-sampling branch to obtain another second feature image, wherein an information quantity of the second feature image obtained through the second down-sampling branch is greater than an information quantity of the second feature image obtained through the first down-sampling branch.

15. The method according to claim 13, wherein the generative network further comprises: a first feature extraction sub-network cascaded after the first super-resolution sub-network and a second feature extraction sub-network cascaded after the down-sampling sub-network;

wherein the processor is further configured to execute the computer program to:

perform feature extraction on the first feature image through the first feature extraction sub-network to obtain and output a second result image; and perform feature extraction on the second feature image through the second feature extraction sub-network to obtain and output a third result image;

generate a second reference image according to the first reference image; and determine a total image loss of the first result image, the second result image and the third result image according to the first reference image and the second reference image.

16. The method according to claim 13, wherein the generative network further comprises: a first feature extraction sub-network cascaded after the first super-resolution sub-network;

wherein the processor is further configured to execute the computer program to:

perform feature extraction on the first feature image through the first feature extraction sub-network to obtain and output a second result image; and determine a total image loss of the first result image and the second result image according to the first reference image.

17. The method according to claim 13, wherein the generative network further comprises: a second feature extraction sub-network cascaded after the down-sampling sub-network;

wherein the processor is further configured to execute the computer program to:

perform feature extraction on the second feature image through the second feature extraction sub-network to obtain and output a third result image; and generate a second reference image according to the first reference image, and determine a total image loss of the first result image and the third result image according to the first reference image and the second reference image.

18. The method according to claim 12, wherein the total image loss comprise: at least one of a content loss, an against loss, a weighted L1 loss or an eye region loss; and in a condition that the total image loss comprises at least one of the weighted L1 loss or the eye region loss, the processor is further configured to execute the computer program to:

determine the weighted L1 loss according to a difference between a pixel value of the at least one result image and a pixel value of the first reference image; and determine the eye region loss according to a content loss of an eye region in the at least one result image and an eye region in the first reference image.

19. The method according to claim 18, wherein the processor is further configured to execute the computer program to::

for each result image, determine a content loss of a total eye region in the result image and a total eye region in the first reference image and a content loss of a first eye region and a second eye region in the result image to serve as a total content loss and a result image content loss, respectively;

determine a content loss of a first eye region and a second eye region in the first reference image to serve as a reference image loss, wherein in the result image and the first reference image, the total eye regions comprise the first eye regions and the second eye regions, and the first eye regions do not overlap with the second eye regions; and determine the eye region loss of the result image and the first reference image according to the total content loss, the result image loss and the reference image loss.

20. The method according to claim 12, wherein the processor is further configured to execute the computer program to:

input the first reference image and the at least one result image into a discrimination network in the image processing model;

discriminate the first reference image and the at least one result image through the discrimination network to determine whether the first reference image and the at least one result image have a preset feature, and output a reference image label and a result image label, wherein the reference image label represents a discriminating result on the first reference image, and the result image label represents a discriminating result on the at least one result image;

determine an against loss of the result image label according to the reference image label; and adjust parameters of the discrimination network according to the against loss, so that an against loss of a result image label output by the adjusted discrimination network meets an against loss condition.

* * * * *